(12) United States Patent
Honda

(10) Patent No.: US 12,362,412 B2
(45) Date of Patent: Jul. 15, 2025

(54) POWER STORAGE MODULE STRUCTURAL MEMBER, POWER STORAGE MODULE INCLUDING POWER STORAGE MODULE STRUCTURAL MEMBER, AND METHOD OF MANUFACTURING POWER STORAGE MODULE STRUCTURAL MEMBER

(71) Applicant: Prime Planet Energy & Solutions, Inc., Tokyo (JP)

(72) Inventor: Ryohei Honda, Himeji (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 620 days.

(21) Appl. No.: 17/706,611

(22) Filed: Mar. 29, 2022

(65) Prior Publication Data

US 2022/0320625 A1 Oct. 6, 2022

(30) Foreign Application Priority Data

Apr. 5, 2021 (JP) .................. 2021-064314

(51) Int. Cl.
*H01M 10/653* (2014.01)
*H01M 50/209* (2021.01)
*H01M 50/224* (2021.01)

(52) U.S. Cl.
CPC ....... *H01M 10/653* (2015.04); *H01M 50/209* (2021.01); *H01M 50/224* (2021.01)

(58) Field of Classification Search
None
See application file for complete search history.

(56) References Cited

U.S. PATENT DOCUMENTS

| | | |
|---|---|---|
| 2013/0034764 A1 | 2/2013 | Ochi et al. |
| 2015/0144409 A1 | 5/2015 | Fujii |
| 2019/0267686 A1 | 8/2019 | Shimizu et al. |
| 2020/0358152 A1 | 11/2020 | Shimizu et al. |
| 2021/0057685 A1* | 2/2021 | Sasaki .............. H01G 11/82 |
| 2021/0249710 A1 | 8/2021 | Kimura et al. |
| 2021/0288363 A1 | 9/2021 | Okada et al. |
| 2022/0285778 A1* | 9/2022 | Takata ............ H01M 50/293 |

FOREIGN PATENT DOCUMENTS

| | | |
|---|---|---|
| CN | 108321314 A | 7/2018 |
| CN | 109478619 A | 3/2019 |
| CN | 109643777 A | 4/2019 |
| CN | 111656553 A | 9/2020 |
| CN | 112514141 A | 3/2021 |
| JP | S63259961 A | 10/1988 |
| JP | H10-71673 A | 3/1998 |
| JP | 2003297303 A | 10/2003 |
| JP | 2006185756 A | 7/2006 |
| JP | 2013-004563 A | 1/2013 |
| JP | 2013033668 A | 2/2013 |
| JP | 2021506062 A | 2/2021 |

(Continued)

*Primary Examiner* — Miriam Stagg
*Assistant Examiner* — M. T. Leonard
(74) *Attorney, Agent, or Firm* — HAUPTMAN HAM, LLP

(57) ABSTRACT

A power storage module structural member includes: a metal member that is in the form of a plate; and an insulating sheet. The insulating sheet has a thermosetting property and is thermocompression-bonded to at least a portion of a surface of the metal member.

7 Claims, 5 Drawing Sheets

(56) References Cited

FOREIGN PATENT DOCUMENTS

| WO | 2014034079 A1 | 3/2014 |
|---|---|---|
| WO | 2018025567 A1 | 2/2018 |
| WO | 2018042763 A1 | 3/2018 |
| WO | 2019110317 A1 | 6/2019 |
| WO | 2019146438 A1 | 8/2019 |
| WO | 2020027299 A1 | 2/2020 |
| WO | 2021033476 A1 | 2/2021 |

* cited by examiner

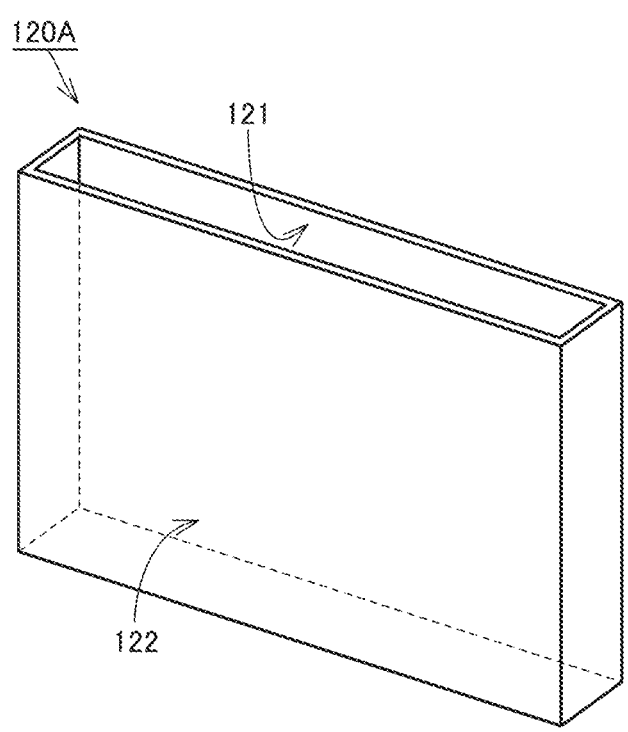

POWER STORAGE MODULE STRUCTURAL MEMBER, POWER STORAGE MODULE INCLUDING POWER STORAGE MODULE STRUCTURAL MEMBER, AND METHOD OF MANUFACTURING POWER STORAGE MODULE STRUCTURAL MEMBER

This nonprovisional application is based on Japanese Patent Application No. 2021-064314 filed on Apr. 5, 2021, with the Japan Patent Office, the entire contents of which are hereby incorporated by reference.

BACKGROUND OF THE INVENTION

Field of the Invention

The present technology relates to a power storage module structural member, a power storage module including the power storage module structural member, and a method of manufacturing the power storage module structural member.

Description of the Background Art

WO2014/034079 is a prior art document that discloses a configuration of a power supply device. The power supply device described in WO2014/034079 includes a battery stack, fastening means, and an insulating sheet. In the battery stack, a plurality of battery cells are stacked. The fastening means fastens the battery stack in a stacking direction of the plurality of battery cells. The insulating sheet is interposed between the battery stack and the fastening means.

SUMMARY OF THE INVENTION

In a power storage module structural member such as a binding bar, an insulating sheet may be adhered and fixed to a metal member by a double-sided tape or the like. In this case, the insulating sheet has to be adhered so as to avoid a foreign matter from being attached to the adhered portion, and therefore there is room for facilitating adhesion of the insulating sheet to the metal member.

The present technology has been made to solve the above-described problem and has an object to provide a power storage module structural member, a power storage module including the power storage module structural member, and a method of manufacturing the power storage module structural member, by each of which adhesion of an insulating sheet to a metal member can be facilitated.

A power storage module structural member according to the present technology includes: a metal member that is in a form of a plate; and an insulating sheet. The insulating sheet has a thermosetting property and is thermocompression-bonded to at least a portion of a surface of the metal member.

A power storage module according to the present technology includes a stack and a binding bar. In the stack, a plurality of power storage cells each having an exterior package are stacked. The binding bar restrains the stack in a stacking direction. At least one of the exterior package and the binding bar includes a metal member and an insulating sheet having a thermosetting property. The insulating sheet is thermocompression-bonded to at least a portion of a surface of the metal member.

A method of manufacturing a power storage module structural member according to the present technology includes: thermocompression-bonding an insulating sheet having a thermosetting property to at least a portion of a surface of a metal member that is in a form of a plate; and performing a pressing process onto the metal member to which the insulating sheet is thermocompression-bonded.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a perspective view showing a configuration of an exterior package serving as a power storage module structural member according to a second embodiment of the present technology.

DESCRIPTION OF THE PREFERRED EMBODIMENTS

Figure 1:
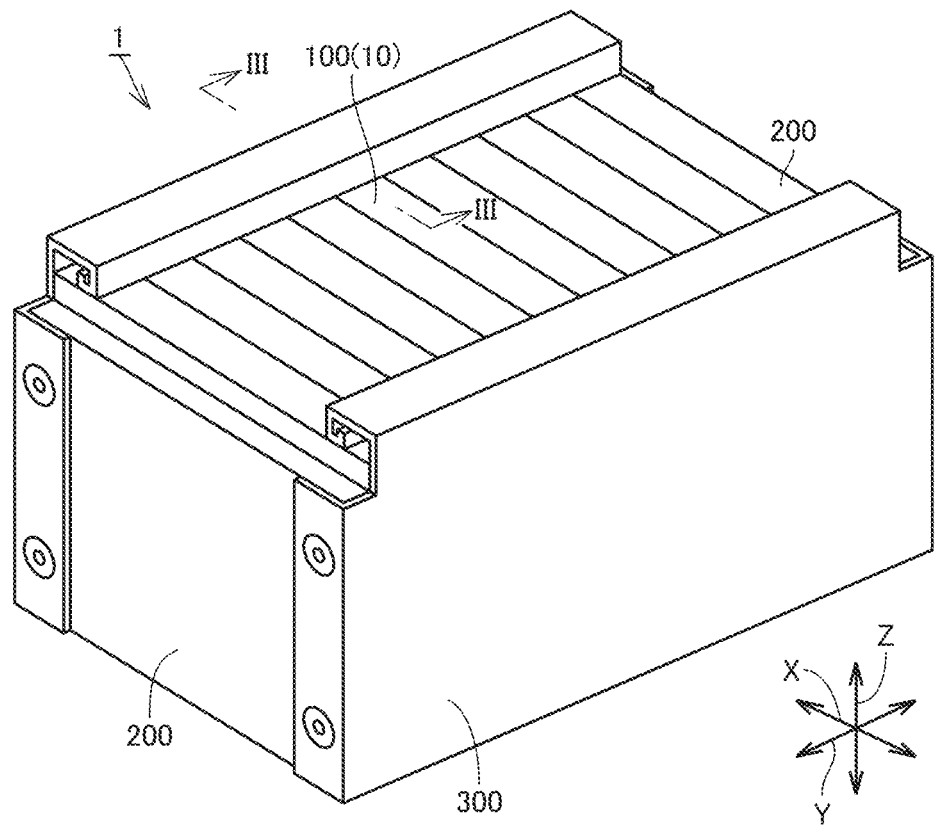
FIG. 1 is a perspective view showing a configuration of a power storage module according to a first embodiment of the present technology.

Hereinafter, embodiments of the present technology will be described. It should be noted that the same or corresponding portions are denoted by the same reference characters, and may not be described repeatedly.

It should be noted that in the embodiments described below, when reference is made to number, amount, and the like, the scope of the present technology is not necessarily limited to the number, amount, and the like unless otherwise stated particularly. Further, in the embodiments described below, each component is not necessarily essential to the present technology unless otherwise stated particularly.

It should be noted that in the present specification, the terms "comprise", "include", and "have" are open-end terms. That is, when a certain configuration is included, a configuration other than the foregoing configuration may or may not be included. Further, the present technology is not limited to one that necessarily exhibits all the functions and effects stated in the present embodiment.

In the present specification, the term "battery" is not limited to a lithium ion battery, and may include another battery such as a nickel-metal hydride battery. In the present specification, the term "electrode" may collectively represent a positive electrode and a negative electrode. Further, the term "electrode plate" may collectively represent a positive electrode plate and a negative electrode plate.

In the present specification, the "power storage cell" or the "power storage module" is not limited to a battery cell or a battery module, and may include a capacitor cell or a capacitor module.

It should be noted that in the figures, an X axis direction represents the longitudinal direction of each power storage cell, a Y axis direction represents a direction in which power storage cells are stacked in the power storage module, and a Z axis direction represents a direction which is orthogonal to the stacking direction of the power storage cells and in which the top surface and bottom surface of the stack are arranged.

First Embodiment

FIG. 1 is a perspective view showing a configuration of a power storage module according to a first embodiment of the present technology. As shown in FIG. 1, a power storage module 1 serving as a battery pack includes a stack 10, end plates 200, and a binding bar 300.

In stack 10, the plurality of power storage cells 100 are stacked side by side in a Y axis direction (arrangement direction). A separator (not shown) is interposed between power storage cells 100. The plurality of power storage cells 100, which are sandwiched between two end plates 200, are pressed by end plates 200, and are therefore restrained between two end plates 200.

End plates 200 are disposed beside both ends of stack 10 in the Y axis direction. Each of end plates 200 is fixed to a base such as a case that accommodates power storage module 1.

A power storage module structural member in the present embodiment is a binding bar 300. Binding bar 300 connects two end plates 200 to each other. Binding bar 300 is fastened to end plates 200 by a well-known fastening method such as bolt fastening.

Binding bar 300 is engaged with end plates 200 with compression force in the Y axis direction being exerted to the plurality of stacked power storage cells 100 and end plates 200, and then the compression force is released, with the result that tensile force acts on binding bar 300 that connects two end plates 200 to each other. As a reaction thereto, binding bar 300 presses two end plates 200 in directions of bringing them closer to each other. As a result, binding bar 300 restrains stack 10 in the stacking direction (Y axis direction).

Figure 2:
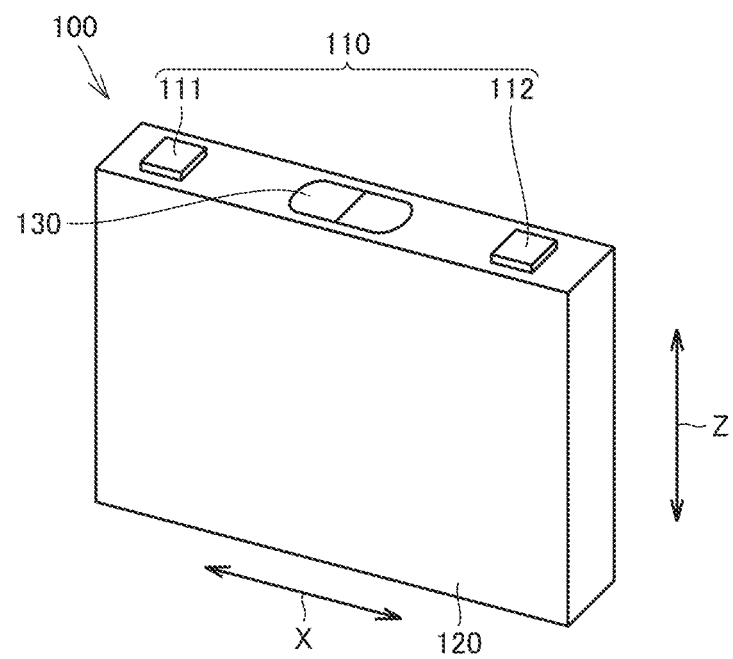
FIG. 2 is a perspective view showing a configuration of a power storage cell included in the power storage module according to the first embodiment of the present technology.

FIG. 2 is a perspective view showing a configuration of a power storage cell included in the power storage module according to the first embodiment of the present technology. As shown in FIG. 2, power storage cell 100 includes an electrode terminal 110, an exterior package 120, and a gas discharge valve 130.

Electrode terminal 110 includes a positive electrode terminal 111 and a negative electrode terminal 112. Electrode terminal 110 is formed on exterior package 120. Exterior package 120 is formed to have a substantially rectangular parallelepiped shape. An electrode assembly (not shown) and an electrolyte solution (not shown) are accommodated in exterior package 120. Gas discharge valve 130 is fractured when pressure inside exterior package 120 becomes equal to or more than a predetermined value. Thus, gas in exterior package 120 is discharged to outside of exterior package 120.

Figure 3:
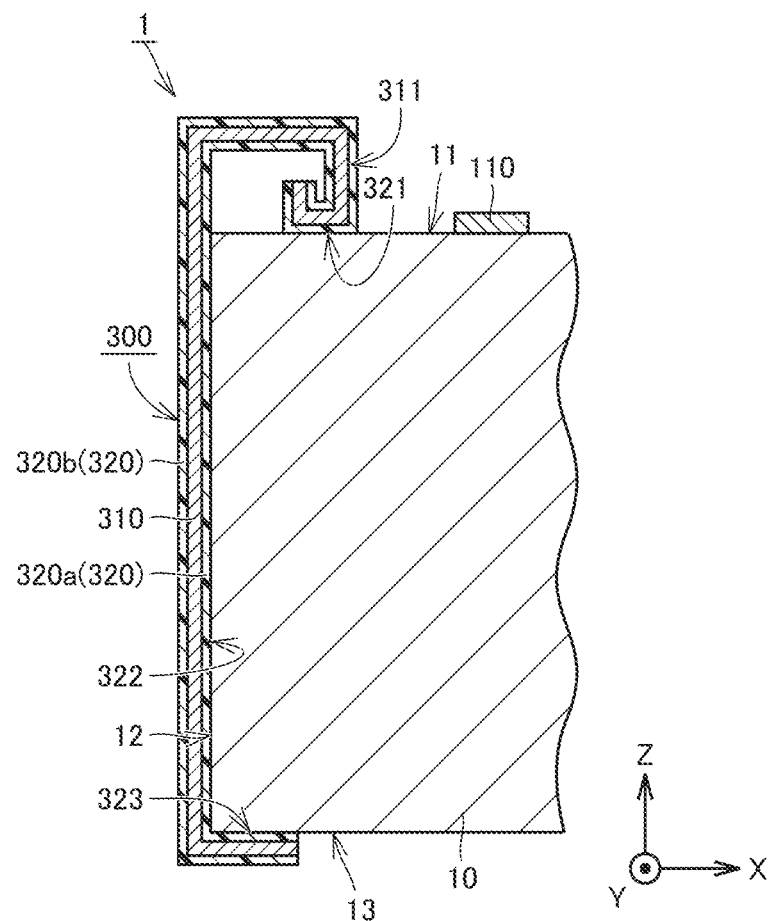
FIG. 3 is a cross sectional view of the power storage module of FIG. 1 when viewed in a direction of an arrowed line III-III.

FIG. 3 is a cross sectional view of the power storage module of FIG. 1 when viewed in a direction of an arrowed line III-III. As shown in FIG. 3, surfaces of stack 10 include a top surface 11, a side surface 12, and a bottom surface 13. Top surface 11 is a surface on which electrode terminal 110 is disposed. Side surface 12 is a surface that connects top surface 11 and bottom surface 13 to each other at their ends in the X axis direction. Bottom surface 13 is a surface disposed opposite to top surface 11 in the Z axis direction.

At least one of exterior package 120 and binding bar 300 includes a metal member 310 and an insulating sheet 320. In the present embodiment, binding bar 300 includes metal member 310 and insulating sheet 320.

Metal member 310 is in the form of a plate. Metal member 310 is composed of, for example, aluminum or an aluminum alloy. It should be noted that metal member 310 is not limited to aluminum or an aluminum alloy, and may be composed of iron, an iron alloy, or the like.

Insulating sheet 320 has a thermosetting property. Insulating sheet 320 has toughness so as not be broken by a below-described pressing process even after being thermoset by heating. Insulating sheet 320 is, for example, an insulating sheet (item number: 1604B) provided by 3M. It should be noted that insulating sheet 320 is not limited to the above-described insulating sheet as long as insulating sheet 320 has toughness so as not to be broken by a pressing process after being thermoset.

The thickness of insulating sheet 320 is, for example, more than or equal to 0.1 mm and less than or equal to 0.15 mm.

Insulating sheet 320 is thermocompression-bonded to at least a portion of a surface of metal member 310. Insulating sheet 320 in the present embodiment is thermocompression-bonded to each of both surfaces of metal member 310. Insulating sheet 320 is adhered to metal member 310 by a below-described structural adhesive agent.

Metal member 310 is in contact with side surface 12 and bottom surface 13 of stack 10 with insulating sheet 320 thermocompression-bonded to one surface of metal member 310 being interposed between metal member 310 and each of side surface 12 and bottom surface 13 of stack 10. Specifically, metal member 310 is in contact with side surface 12 and bottom surface 13 of stack 10 with one insulating sheet 320a thermocompression-bonded to one surface of metal member 310 being interposed between metal member 310 and each of side surface 12 and bottom surface 13 of stack 10. That is, a side-surface contact surface 322 of binding bar 300 is in contact with side surface 12, and a bottom-surface contact surface 323 of binding bar 300 is in contact with bottom surface 13.

Metal member 310 is in contact with top surface 11 with insulating sheet 320 thermocompression-bonded to the other surface of metal member 310 being interposed between metal member 310 and top surface 11 by folding back a portion of metal member 310 to be in contact with top surface 11. Specifically, in metal member 310, a folded-back portion 311 is formed by folding back, together with insulating sheet 320, the end portion of metal member 310 on the top surface 11 side. Folded-back portion 311 is folded back by hemming, for example. Metal member 310 is in contact with top surface 11 of stack 10 with the other insulating sheet 320b thermocompression-bonded to the other surface of metal member 310 being interposed between metal member 310 and top surface 11 of stack 10. That is, a top-surface contact surface 321 of binding bar 300 is in contact with top surface 11.

Metal member 310 sandwiches stack 10 in the direction (Z axis direction) in which top surface 11 and bottom surface 13 are arranged. In binding bar 300 before sandwiching stack 10, a distance between top-surface contact surface 321 and bottom-surface contact surface 323 in the Z axis direction is shorter than a distance between top surface 11 and bottom surface 13. Thus, when binding bar 300 sandwiches stack 10, tensile force acts on metal member 310 in the Z axis direction. As a reaction thereto, binding bar 300 presses stack 10 in the Z axis direction.

It should be noted that although metal member 310 in the present embodiment sandwiches stack 10 as described above, it is not limited to this configuration, and metal member 310 and stack 10 may be fixed to each other by providing a space between metal member 310 and top surface 11 in the Z axis direction and inserting a spacer in the space. Further, when metal member 310 and stack 10 are fixed to each other by inserting the spacer, no folded-back portion 311 may be provided in metal member 310. Further, when no folded-back portion 311 is provided in metal member 310, insulating sheet 320 may be thermocompression-bonded only to the above-described one surface of metal member 310.

The following describes details of a method of manufacturing the power storage module structural member and the insulating sheet according to the first embodiment.

Figure 4:
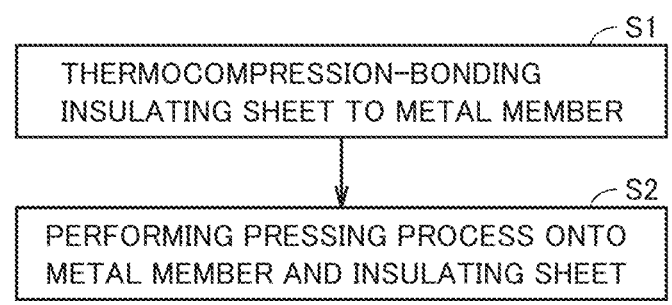
FIG. 4 is a flowchart showing a method of manufacturing the power storage module structural member according to the first embodiment of the present technology.
Figure 5:
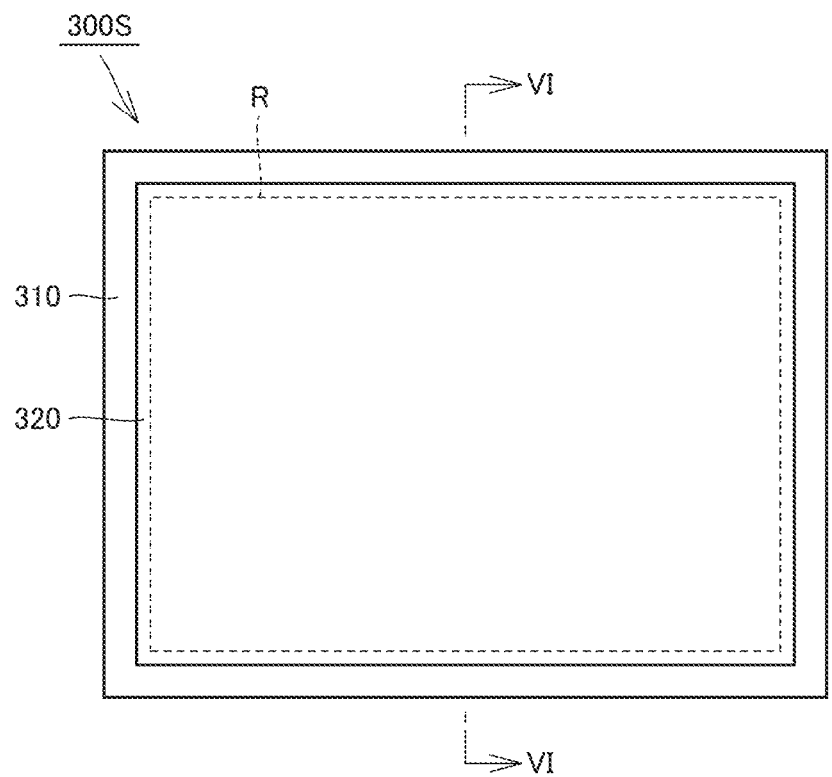
FIG. 5 is a front view showing a plate member before shaping into the power storage module structural member according to the first embodiment of the present technology.
Figure 6:
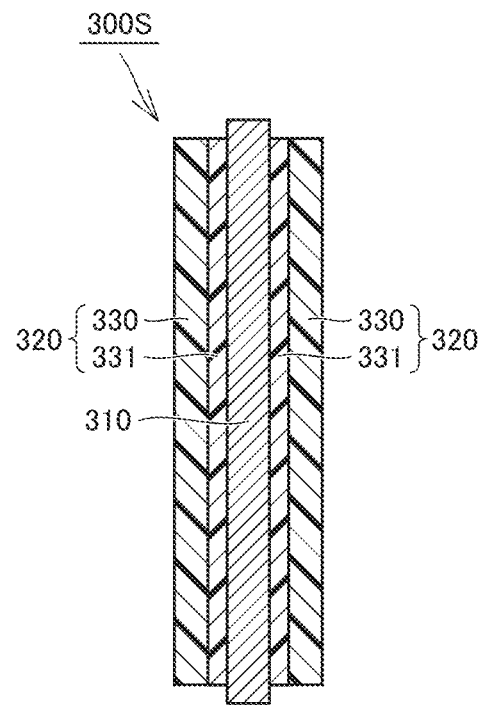
FIG. 6 is a cross sectional view of the plate member of FIG. 5 when viewed in a direction of an arrowed line VI-VI.
Figure 7:
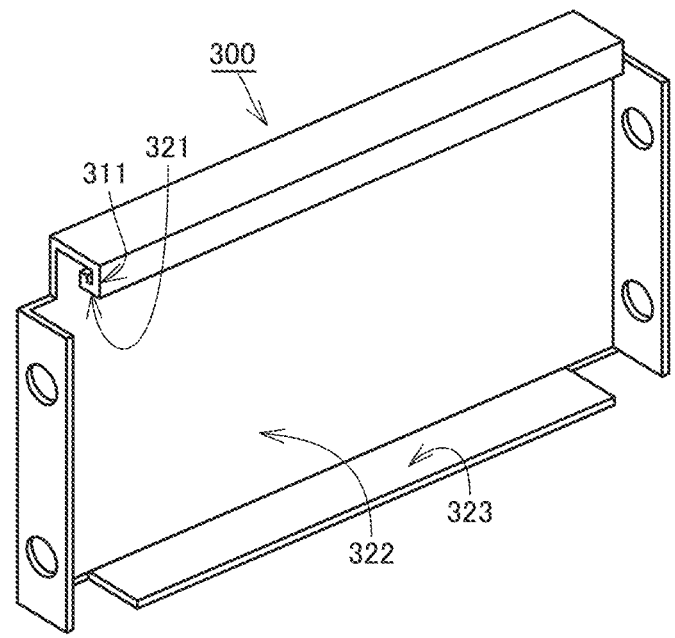
FIG. 7 is a perspective view showing a configuration of a binding bar serving as the power storage module structural member according to the first embodiment of the present technology.

FIG. 4 is a flowchart showing a method of manufacturing the power storage module structural member according to the first embodiment of the present technology. FIG. 5 is a front view showing a plate member before shaping into the power storage module structural member according to the first embodiment of the present technology. FIG. 6 is a cross sectional view of the plate member of FIG. 5 when viewed in a direction of an arrowed line VI-VI. FIG. 7 is a perspective view showing a configuration of the binding bar serving as the power storage module structural member according to the first embodiment of the present technology. It should be noted that in FIG. 7, a boundary between the metal member and the insulating sheet is not shown.

As shown in FIGS. 4 to 6, in the method of manufacturing the power storage module structural member according to the first embodiment of the present technology, first, insulating sheet 320 having a thermosetting property is thermocompression-bonded to at least a portion of a surface of metal member 310 that is in the form of a plate (step S1). In the present embodiment, as shown in FIG. 6, by pressing a heater (not shown) against metal member 310 with insulating sheet 320 interposed therebetween, insulating sheet 320 is thermocompression-bonded to each of both surfaces of metal member 310. In this way, a plate member 300S is formed.

Insulating sheet 320 includes a substrate 330 and a structural adhesive agent 331. Substrate 330 is, for example, a sheet composed of a resin. The material of substrate 330 is preferably polypropylene (PP), polyethylene terephthalate (PET), polyphenylene sulfide (PPS), polyimide (PI), or polyolefin (PO), for example. It should be noted that an additive such as rubber particles is added to substrate 330 so as to provide toughness even after being thermoset.

Structural adhesive agent 331 is provided on the surface of insulating sheet 320 to be thermocompression-bonded to metal member 310. Insulating sheet 320 is adhered to metal member 310 by structural adhesive agent 331. When thermocompression-bonding insulating sheet 320 to metal member 310, structural adhesive agent 331 is heated via substrate 330 and melted, with the result that insulating sheet 320 is adhered to metal member 310. On this occasion, substrate 330 is heated and thermoset. Substrate 330 having been thermoset has toughness so as not to be broken by a subsequent pressing process.

Structural adhesive agent 331 is, for example, an adhesive agent mainly composed of an epoxy resin. The structural adhesive agent is an adhesive agent that has a 180° peel adhesion strength of at least 1.2 N/mm and that has a shear adhesion strength of at least 7 MPa.

A self-extinguishing material is provided on a surface of insulating sheet 320. The self-extinguishing material in the present embodiment is included in structural adhesive agent 331. The self-extinguishing material in the present embodiment is a non-flammable material satisfying the following condition: in an evaluation on burning resistance as defined in a method A of JIS (JIS K 6911: 2006), a test piece is subjected to a flame for 30 seconds, burning of the test piece ceases within 180 seconds after removing the flame, and the length of burning of the test piece is less than or equal to 25 mm. With this self-extinguishing material, burning of insulating sheet 320 is prevented.

As shown in FIG. 5, metal member 310 and insulating sheet 320 are punched into a shape of range R. Thus, insulating sheet 320 is located on the whole of the surface of metal member 310. It should be noted that insulating sheet 320 may not be provided on the whole of the surface of metal member 310 as long as insulation between metal member 310 and stack 10 can be secured. In the present embodiment, insulating sheet 320 may not be provided at a portion at which metal member 310 is in contact with end plate 200.

Next, as shown in FIGS. 4 and 7, in the method of manufacturing the power storage module structural member according to the first embodiment of the present technology, a pressing process is performed onto the metal member to which the insulating sheet is thermocompression-bonded (step S2). Thus, plate member 300S is shaped into the shape of binding bar 300. Specifically, by performing the pressing process onto plate member 300S, folded-back portion 311, top-surface contact surface 321, side-surface contact surface 322, and bottom-surface contact surface 323 are formed.

In each of the power storage module structural member, the power storage module including the power storage module structural member, and the method of manufacturing the power storage module structural member according to the first embodiment of the present technology, since insulating sheet 320 having a thermosetting property is thermocompression-bonded to the surface of metal member 310, a foreign matter can be suppressed from being attached to the adhered portion because the insulating sheet before heating does not have an adhesion property, and the positions of metal member 310 and insulating sheet 320 can be freely adjusted when adhering metal member 310 and insulating sheet 320 to each other, thereby facilitating adhesion of insulating sheet 320 to metal member 310 as compared with a case where insulating sheet 320 is adhered and fixed to metal member 310 by a double-sided tape or the like.

In the power storage module structural member according to the first embodiment of the present technology, since structural adhesive agent 331 is provided on the surface of insulating sheet 320 to be thermocompression-bonded to metal member 310, insulating sheet 320 can be firmly adhered to metal member 310.

In the power storage module structural member according to the first embodiment of the present technology, the self-extinguishing material is provided on the surface of insulating sheet 320, thereby providing insulating sheet 320 with burning resistance.

In the power storage module structural member according to the first embodiment of the present technology, since the power storage module structural member is binding bar 300, adhesion of insulating sheet 320 to metal member 310 in binding bar 300 can be facilitated.

In power storage module 1 according to the first embodiment of the present technology, metal member 310 is in contact with side surface 12 and bottom surface 13 of stack 10 with one insulating sheet 320a being interposed between metal member 310 and each of side surface 12 and bottom surface 13 of stack 10, and metal member 310 is in contact with top surface 11 of stack 10 with the other insulating sheet 320b being interposed between metal member 310 and top surface 11 of stack 10 by folding back a portion of metal member 310 to be in contact with top surface 11. Hence, while insulating binding bar 300 and stack 10 from each other without using a spacer additionally, stack 10 can be sandwiched by binding bar 300 in the direction (Z axis direction) in which top surface 11 and bottom surface 13 are arranged.

Hereinafter, a modification of the power storage module structural member according to the first embodiment of the present technology will be described. Since the power storage module structural member according to the below-described modification is different from the power storage module structural member according to the first embodiment of the present technology in terms of configurations of the metal member and the insulating sheet, the same configurations as those in the power storage module structural member according to the first embodiment of the present technology will not be described repeatedly.

Figure 8:
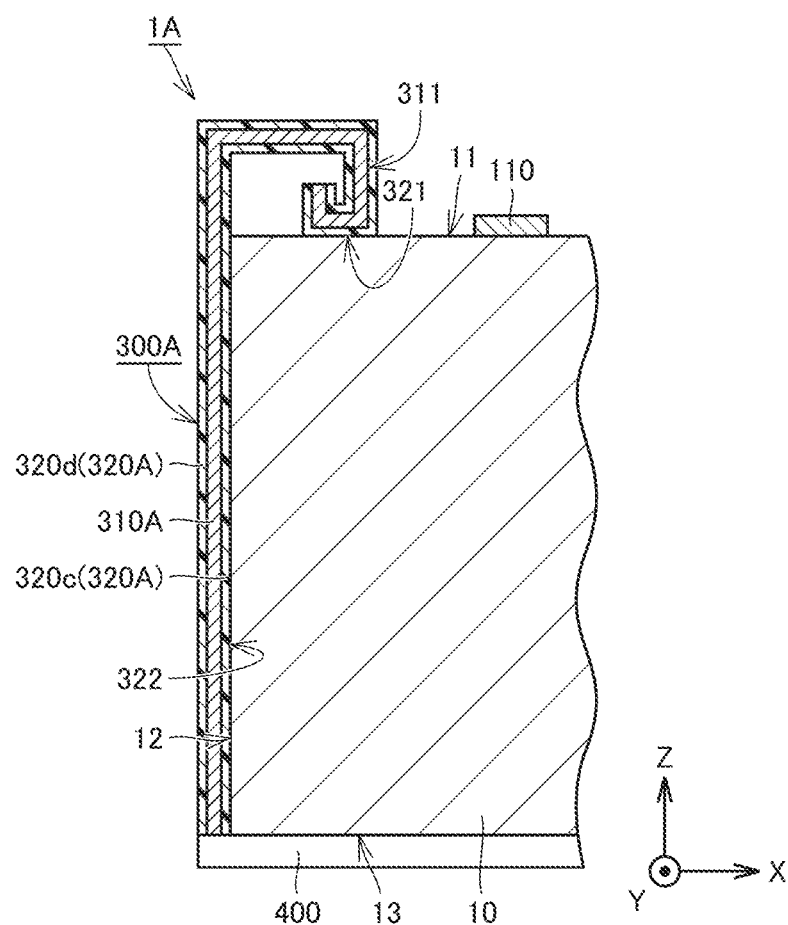
FIG. 8 is a cross sectional view showing a configuration of a power storage module according to a modification of the first embodiment of the present technology.

FIG. 8 is a cross sectional view showing the configuration of the power storage module according to the modification of the first embodiment of the present technology. As shown in FIG. 8, a power storage module 1A according to the modification of the first embodiment of the present technology includes stack 10, the end plates, a binding bar 300A, and a cooling member 400.

The power storage module structural member in the present modification is binding bar 300A. Binding bar 300A connects the two end plates to each other. Binding bar 300A includes a metal member 310A and an insulating sheet 320A.

Metal member 310A is in contact with side surface 12 of stack 10 with insulating sheet 320A thermocompression-bonded to one surface of metal member 310A being interposed between metal member 310A and side surface 12 of stack 10. Specifically, metal member 310A is in contact with side surface 12 of stack 10 with one insulating sheet 320c thermocompression-bonded to one surface of metal member 310A being interposed between metal member 310A and side surface 12 of stack 10. That is, a side-surface contact surface 322 of binding bar 300A is in contact with side surface 12.

Metal member 310A is in contact with top surface 11 of stack 10 with the other insulating sheet 320d thermocompression-bonded to the other surface of metal member 310A being interposed between metal member 310A and top surface 11 of stack 10. That is, a top-surface contact surface 321 of binding bar 300A is in contact with top surface 11.

Metal member 310A presses stack 10 from the top surface 11 side in the Z axis direction. Specifically, by connecting binding bar 300A and the two end plates with stack 10 being pressed from the top surface 11 side by top-surface contact surface 321, metal member 310A presses stack 10 in the Z axis direction.

Cooling member 400 is disposed adjacent to bottom surface 13. Specifically, cooling member 400 is adhered to the whole of bottom surface 13 by an adhesive agent (not shown). Cooling member 400 is, for example, a cooling sheet composed of a resin constituted of silicone or the like. It should be noted that cooling member 400 is not limited to the form of a sheet, and may be in the form of a gel.

In the power storage module structural member included in power storage module 1A according to the modification of the first embodiment of the present technology, metal member 310A is in contact with side surface 12 of stack 10 with one insulating sheet 320c being interposed between metal member 310A and side surface 12 of stack 10, and metal member 310A is in contact with top surface 11 of stack 10 with the other insulating sheet 320d being interposed between metal member 310A and top surface 11 of stack 10 by folding back a portion of metal member 310A to be in contact with top surface 11 of stack 10. Hence, while insulating binding bar 300A and stack 10 from each other without using a spacer additionally, stack 10 can be pressed by binding bar 300A from top surface 11 side in the Z axis direction and stack 10 can be cooled by cooling member 400.

Second Embodiment

Hereinafter, a power storage module structural member according to a second embodiment of the present technology will be described. Since the power storage module structural member according to the second embodiment of the present technology is different from the power storage module structural member according to the first embodiment of the present technology in terms of a purpose of use of the power storage module structural member, the same configurations as those in the power storage module structural member according to the first embodiment of the present technology will not be described repeatedly.

FIG. 9 is a perspective view showing a configuration of an exterior package serving as the power storage module structural member according to the second embodiment of the present technology. In FIG. 9, a boundary between the metal member and the insulating sheet is not shown.

As shown in FIG. 9, the power storage module structural member in the present embodiment is an exterior package 120A. Exterior package 120A includes a metal member 121 and an insulating sheet 122. Exterior package 120A is formed to have a prismatic shape with a bottom. An electrode assembly (not shown) and an electrolyte solution (not shown) are accommodated in exterior package 120A.

Insulating sheet 122 is thermocompression-bonded to at least a portion of a surface of metal member 121. Insulating sheet 122 in the present embodiment is thermocompression-bonded to one surface of metal member 121. Insulating sheet 122 is adhered to metal member 121 by a structural adhesive agent (not shown). It should be noted that insulating sheet 122 may be thermocompression-bonded to each of both surfaces of metal member 121.

Exterior package 120A is formed by performing a pressing process onto a plate member constituted of metal member 121 which is in the form of a flat plate and to which insulating sheet 122 is thermocompression-bonded.

In the power storage module structural member according to the second embodiment of the present technology, since the power storage module structural member is exterior package 120A and insulating sheet 122 having a thermosetting property is thermocompression-bonded to the surface of metal member 121, insulating sheet 122 can be provided to cover at least one of the outer surface and inner surface of metal member 121 that is in the form of a prismatic shape with a bottom, thereby facilitating adhesion of insulating sheet 122 to metal member 121 as compared with a case where insulating sheet 122 is adhered and fixed to metal member 121 by a double-sided tape or the like.

Although the embodiments of the present invention have been described and illustrated in detail, it is clearly understood that the same is by way of illustration and example only and is not to be taken by way of limitation, the scope of the present invention being interpreted by the terms of the appended claims.

What is claimed is:

1. A power storage module, comprising:
a stack in which a plurality of power storage cells each having an exterior package are stacked in a stacking direction; and
a binding bar that restrains the stack in a first direction which is the stacking direction, wherein
the binding bar includes a metal member and an insulating sheet having a thermosetting property, the insulating sheet being provided to at least a portion of a surface of the metal member,
the stack has:
a top surface,
a bottom surface opposite to the top surface in a second direction orthogonal to the first direction, and
a side surface connecting the top surface and the bottom surface to each other at ends of the top surface and the bottom surface in a third direction orthogonal to the first direction and the second direction,
the metal member has
a first surface, and
a second surface facing the first surface,
the insulating sheet has
a first insulating sheet on the first surface, and
a second insulating sheet on the second surface,
the first insulating sheet is in contact with the side surface,
the metal member has a folded back portion that is in contact with the top surface at which the second surface of the metal member faces the top surface of the stack,
the second insulating sheet is in contact with the top surface, and
the metal member presses the stack from a side of the top surface in the second direction.

2. The power storage module according to claim 1, wherein
the insulating sheet is thermocompression-bonded to each of both the first and second surfaces of the metal member,
the metal member is in contact with the side surface and the bottom surface of the stack with the first insulating sheet being interposed between the metal member and each of the side surface and the bottom surface of the stack, and
the metal member sandwiches the stack in the second direction.

3. The power storage module according to claim 1, wherein the second insulating sheet is in surface contact with the top surface.

4. The power storage module according to claim 1, wherein
a part of the metal member located on the side of the top surface has
a first portion extending toward the top surface along the second direction when viewed from the first direction,
a second portion connected to an end portion of the first portion in the second direction and extending along the third direction when viewed from the first direction, and
a third portion which is an end portion of the metal member and connected to an end portion of the second portion in the third direction and extending in a direction away from the top surface in the second direction when viewed from the first direction, and
in the second portion, the second insulating sheet is in surface contact with the top surface.

5. The power storage module according to claim 1, wherein the second insulating sheet is in continuous contact with the top surface of the stack along the first direction over an entire length of the top surface.

6. The power storage module according to claim 1, wherein
the first insulating sheet is thermocompression-bonded to a portion of the first surface of the metal member,
the second insulating sheet is thermocompression-bonded to a portion of the second surface of the metal member, and
a structural adhesive agent is provided on a surface of the first insulating sheet and on a surface of the second insulating sheet to be thermocompression-bonded to the metal member.

7. The power storage module according to claim 1, wherein a self-extinguishing material is provided on a surface of the first insulating sheet and on a surface of the second insulating sheet.

* * * * *